US007890561B2

(12) United States Patent
Boerstler et al.

(10) Patent No.: US 7,890,561 B2
(45) Date of Patent: *Feb. 15, 2011

(54) RANDOM NUMBER GENERATOR

(75) Inventors: David William Boerstler, Round Rock, TX (US); Eskinder Hailu, Austin, TX (US); Harm Peter Hofstee, Austin, TX (US); John Samuel Liberty, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1553 days.

This patent is subject to a terminal disclaimer.

(21) Appl. No.: 11/204,402

(22) Filed: Aug. 16, 2005

(65) Prior Publication Data
US 2007/0043798 A1   Feb. 22, 2007

(51) Int. Cl.
*G06F 1/02* (2006.01)
*G06F 7/58* (2006.01)
(52) U.S. Cl. ...................... 708/251; 708/250
(58) Field of Classification Search ........................ None
See application file for complete search history.

(56) References Cited

U.S. PATENT DOCUMENTS

| 4,905,176 | A |   | 2/1990  | Schulz            |
|-----------|---|---|---------|-------------------|
| 5,117,380 | A |   | 5/1992  | Tanagawa          |
| 5,706,218 | A | * | 1/1998  | Hoffman ... 708/251 |
| 5,963,104 | A |   | 10/1999 | Buer              |
| 6,061,702 | A | * | 5/2000  | Hoffman ... 708/251 |
| 6,480,072 | B1 |  | 11/2002 | Walsh et al.      |
| 6,480,870 | B1 |  | 11/2002 | Park              |
| 6,667,665 | B2 |  | 12/2003 | Janssen           |
| 7,058,674 | B2 | * | 6/2006 | Takagi ............. 708/251 |
| 7,135,935 | B2 |  | 11/2006 | Kim               |
| 7,233,212 | B2 | * | 6/2007 | Boerstler et al. ... 331/78 |
| 2005/0055391 | A1 | * | 3/2005 | Carlson et al. ... 708/250 |
| 2006/0220753 | A1 | * | 10/2006 | Boerstler et al. ... 331/46 |

FOREIGN PATENT DOCUMENTS

CN          1599247 A          3/2005

OTHER PUBLICATIONS

K. Sarkies, "Circuit Simulation Using PSpice Schematics", Oct. 10, 2004.*
Ritter, T.; "Random Number Machines: A Literature Survey—Research Comments from Ciphers by Ritter"; Dec. 4, 2002; http://www.ciphersbyritter.com/RES/RNGMACH.HTM.

* cited by examiner

*Primary Examiner*—Lewis A Bullock, Jr.
*Assistant Examiner*—Mark A Gooray
(74) *Attorney, Agent, or Firm*—Thomas E. Tyson; Matthew Talpis

(57) ABSTRACT

A random number generator, a method, and a computer program product are provided for producing a random number seed. Each oscillator within an array of oscillators operates at a different frequency. The operating frequencies of each oscillator are not harmonically related, such that no integer multiple exists between the frequencies of any two oscillators. In one embodiment, the outputs of the array of oscillators connect to a multiple input latch. The multiple input latch also receives a sample signal, which is a clock signal. The clock signal samples the outputs of the array of oscillators, and the multiple input latch in conjunction with the random number determination logic ("RNDL") produces a digital output (0 or 1) for each oscillator within the array. The RNDL uses these digital outputs to create a random number seed.

18 Claims, 6 Drawing Sheets

RANDOM NUMBER GENERATOR

FIELD OF THE INVENTION

The present invention relates generally to a random number generator, and more particularly, to a random number generator that utilizes an array of oscillators.

DESCRIPTION OF THE RELATED ART

A processor uses a random number generator for security reasons. Every time that a processor powers on it generates a random number seed. The processor provides a random number from the random number seed within external data transmissions to identify the specific processor to external processors or data processing systems. For example, the random number seed contains multiple digital bits that are stored when the processor powers on. Whereas, the random number transmitted to external sources can be the random number seed itself or a transformation of the random number seed. The security problem is that the specific processor only wants to be identified by the intended party or parties of the data transmission. Outside parties can break into the specific processor if they can determine the number seed. Therefore, a random number generator provides a different number seed for the processor every time the processor is powered on. There should be no repeat numbers in the random number sequence, and outside parties should not be able to reverse engineer the number seed to break the processor. Accordingly, the ultimate goal of a random number generator is to produce truly random numbers that cannot be reverse engineered.

One conventional method of producing a random number involves creating a circuit that generates noise and amplifies the noise to digital levels. Then a processor samples the noise generator to pick up a random bit. This type of random number generator works adequately provided that the samplings are well-spaced and irregular, and that the number of 1's and 0's do not have the same probability of being sampled. Another conventional method involves accumulating these digital numbers over time to produce the random number. This type of post processing can improve this type of random number generator by further discouraging reverse engineering. A sampled hardware chaotic circuit is another form of a random number machine. A chaotic circuit has various problems of balance and correlation, and furthermore may not be closely associated with truly random sources. The problem with these techniques is that they are deterministic, discoverable, and not sufficiently random. Security concerns arise if the random number generated can be discovered. Therefore, it is clear that a random number generator, which can produce number seeds that exhibit more randomness and less discoverability is a significant improvement over the prior art.

SUMMARY OF THE INVENTION

The present invention provides a random number generator, a method, and a computer program product for producing a random number seed. Each oscillator within an array of oscillators operates at a different frequency. The operating frequencies of each oscillator are not harmonically related, such that no integer multiple exists between the frequencies of any two oscillators. In one embodiment, the outputs of the array of oscillators connect to a multiple input latch. An array of single input latches can replace the multiple input latch. The multiple input latch also receives a sample signal, which is a clock signal. The clock signal samples the outputs of the array of oscillators, and the multiple input latch in conjunction with random number determination logic ("RNDL") produces a digital output (0 or 1) for each oscillator within the array. The RNDL uses these digital outputs to create a random number seed. Accordingly, the random number seed is a binary number, where the number of digits in the random number seed is equal to the number of oscillators within the array.

In a preferred embodiment, the array of oscillators contains a number of multistage free-running ring oscillators each operating with random jitter. The noise elements that cause the measured period to vary from the inherent period of the oscillator are known as jitter. Therefore, the jitter of each oscillator and the relative phase uncertainty between any two oscillators within the array accumulate over time. The frequency differences between the oscillators also create a deterministic phase uncertainty that grows over time. These features lead to a random number seed with more randomness and less predictability than previous random number generators.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code, software, and/or integrated circuits that are coded to perform such functions, unless indicated otherwise.

Figure 1:
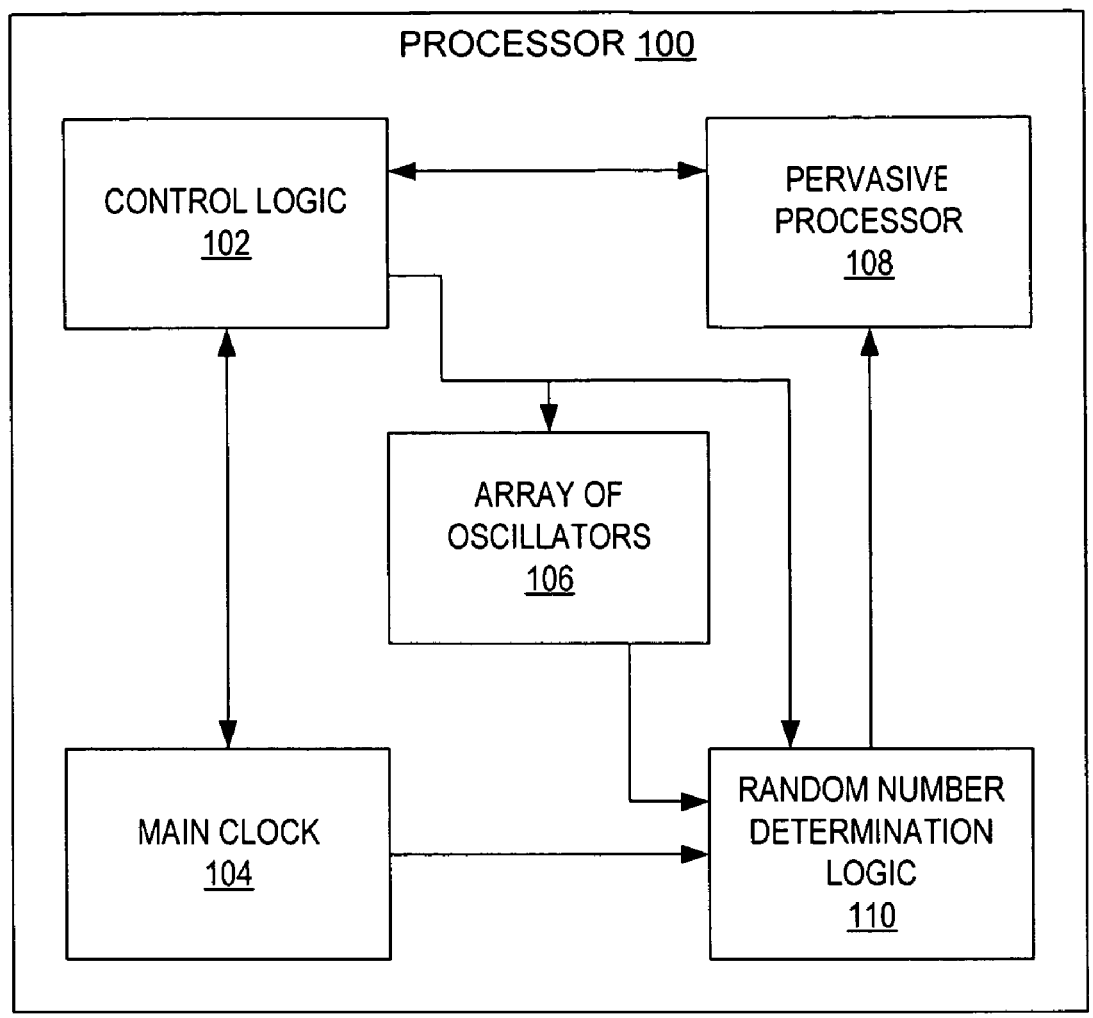
FIG. 1 depicts a block diagram of a processor that houses a random number generator.

FIG. 1 depicts a block diagram of a processor 100 that houses a random number generator. As shown with reference to FIG. 6 processor 100 can connect to many different components. Control logic 102 sends control signals to the devices within processor 100 in accordance with a set of instructions executing within processor 100. Accordingly, control logic 102 sends control signals to main clock 104, array of oscillators 106, pervasive processor 108, and random number determination logic 110. Main clock 104 provides the global clock signal for processor 100. The main clock 104 feeds the global clock signal to control logic 102 and random number determination logic 110.

Array of oscillators 106 contains a number of oscillators that produce signals at varying frequencies. In this diagram array of oscillators 106 are shown in one box, but in the implementation of this invention the array of oscillators can be placed anywhere on processor 100. The outputs of array of oscillators 106 feed random number determination logic ("RNDL") 110. RNDL 110 generates the random number from the outputs of array of oscillators 106. RNDL 110 transmits the random number to pervasive processor 108 (also called a maintenance processor). The use of pervasive processor 108 is implementation specific, but it can control the power supplies, the random number generator, the oscillators, and the clocks on the chip. Normally, processor 100 produces the random number seed on demand. Processor 100 can request a random number seed for every power up or pervasive processor 108 can request a random number seed for external data transmissions.

In this diagram, pervasive processor 108 receives the random number and transmits it to control logic 102, wherein control logic 102 can provide the random number to external sources. Accordingly, pervasive processor 108 can send out its own control signals, but in this diagram the control logic 102 sends out the control signals. Array of oscillators 106 and RNDL 110 make up the random number generator. The random number generator is independent and can reside anywhere within the processor 100. This diagram is an example of a processor, and does not limit the scope of the present invention.

Figure 2:
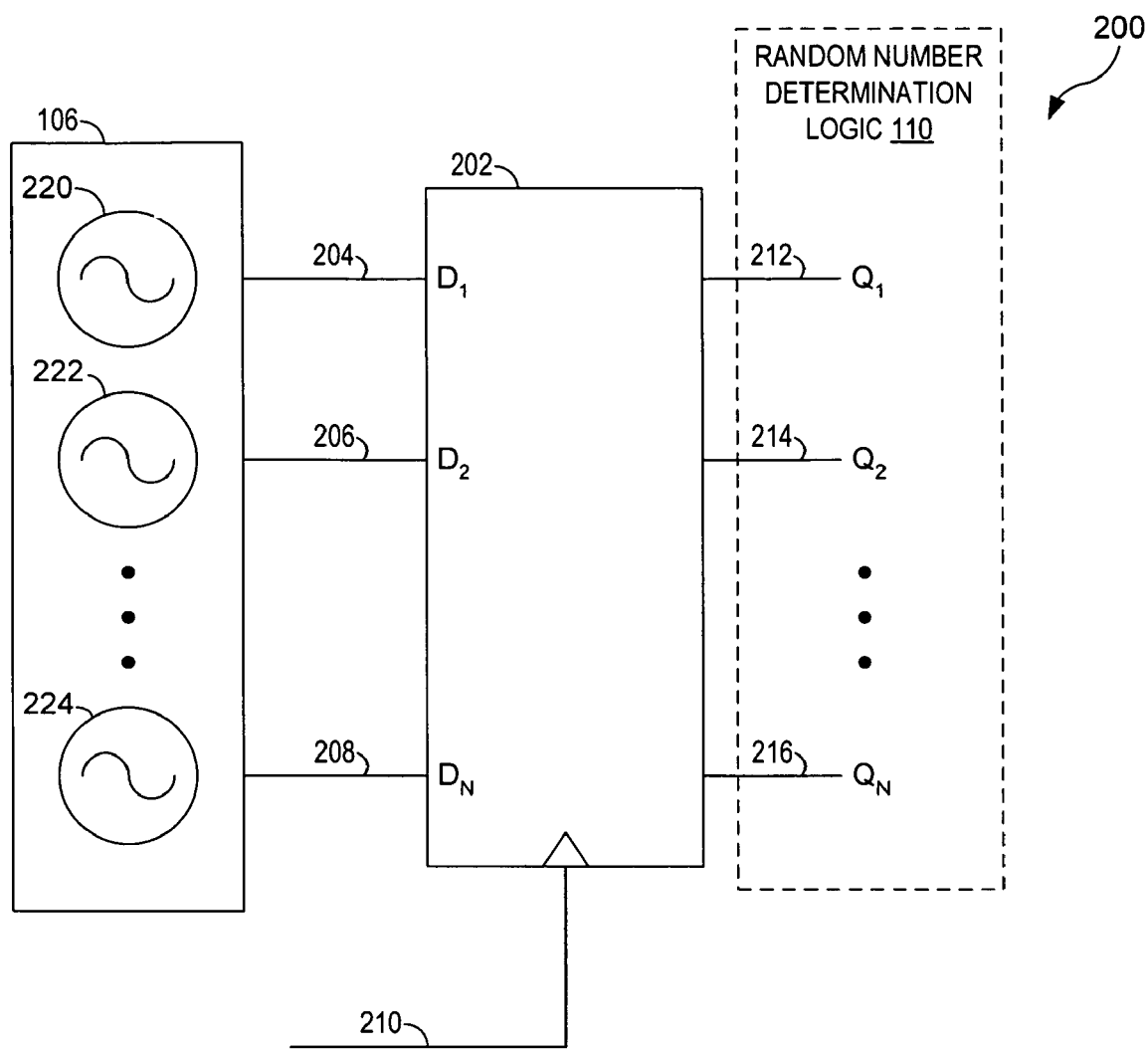
FIG. 2 depicts a block diagram of a modified random number generator comprising an array of oscillators and random number determination logic.

FIG. 2 depicts a block diagram of a modified random number generator 200 comprising an array of oscillators and random number determination logic. Array of oscillators 106 relates to FIG. 1. As previously described, the oscillators 220, 222, and 224 do not have to be aligned as shown in this diagram. The outputs of array of oscillators 106 feed a multiple input latch 202. This latch 202 can be a multiple input D flip-flop or a conventional multiple input latch. FIG. 2 shows a multiple input latch 202, but an array of single input latches may replace multiple input latch 202. Accordingly, one single input latch connects to each corresponding oscillator. Accordingly, oscillator 220 feeds input $D_1$ through input line 204, oscillator 222 feeds input $D_2$ through input line 206, and oscillator 224 feeds input DN through input line 208. This multiple input latch 202 provides the oscillator outputs 212, 214, 216 to RNDL 110 from FIG. 1. In different embodiments of the present invention, multiple input latch 202 may also reside on RNDL 110 or on array of oscillators 106. A sample signal 210 is an input to latch 202. In this implementation, sample signal 210 is a clock signal from the main clock 104 of FIG. 1. Clock signal 210 samples the outputs of array of oscillators 106. Clock signal input 210 does not adjust or calibrate the oscillators.

Latch 202 in conjunction with RNDL 110 provide the outputs of the oscillators 220, 222, and 224 as digital bits (1's or 0's). Accordingly, an oscillating signal oscillates from a high voltage to a low voltage. A sample of the oscillating signal by latch 202 shows a high voltage or a low voltage. In one embodiment, RNDL 110 assigns a 1 for a high voltage and a 0 for a low voltage. Latch 202 samples the digital bits in response to the clock signal 210. For example, latch 202 may provide the digital bits on a rising edge of the global clock signal. Accordingly, $Q_1$ 212 is a digital bit representation of oscillator 220, $Q_2$ 214 is a digital bit representation of oscillator 222, and $Q_N$ 216 is a digital bit representation of oscillator 224. The number of oscillators in array of oscillators 106 determines the bit length of the random number. In this diagram, three oscillators 220, 222, and 224 in conjunction with RNDL 110 produce a three bit random number, such as "001" or "101." The random number determination logic 110 transforms the digital bit outputs $Q_1$ 212, $Q_2$ 214, and $Q_N$ 216 into a random number. To provide even more randomness, the random number determination logic 110 can transform these digital bits into a random number in many different ways. For example, a first random number could consist of $Q_1$ 212, $Q_2$ 214, and $Q_N$ 216, a second random number could consist of $Q_N$ 216, $Q_2$ 214, and $Q_1$ 212, and a third random number could consist of $Q_2$ 214, $Q_N$ 216, and $Q_1$ 212. As previously described multiple D flip-flops or latches can replace latch 202 in the present invention. For example, three separate latches could provide $Q_1$ 212, $Q_2$ 214, and $Q_N$ 216. FIG. 2 illustrates one multiple input latch 202 because this embodiment makes testing less complicated. For testing, the multiple input latch 202 only receives one test pattern, and the results can be read from the outputs of the latch 212, 214, and 216. Multiple latches require multiple test patterns.

In a preferred embodiment, oscillators 220, 222, and 224 operate at different high frequencies, $F_1$, $F_2$, and $F_N$, respectively, such that no two frequencies are harmonically related. Therefore, the oscillators within the array 106 are independent of each other, and no integer multiple exists between the frequencies of any two oscillators. For example, the three oscillators 220, 222, and 224 in FIG. 2 could operate at 2.656 GHz, 1.713 GHz, and 0.923 GHz, respectively. High, harmonically related frequencies can cause oscillators that are in close proximity to exhibit injection locking effects. Injection locking effects cause oscillators to operate in unison, which detrimentally affects the randomness of the random number generator. By using oscillators with frequencies that are not harmonically related, the present invention enables the oscillators to be housed in close proximity with one another without exhibiting injection locking effects. The processor 100 can power off the random number generator 200 after the random number is provided, or leave the random number generator 200 powered on.

In a preferred embodiment, array of oscillators 106 consist of N multistage free-running ring oscillators, each operating with random jitter. An oscillator produces a clock signal that has an inherent frequency and period (for example, a clock signal at 2.656 GHz has a period of 377 ps). The noise elements that cause the measured period to vary from the oscillator's inherent period are known as jitter. Jitter is composed of both deterministic (for example, specific cause such as power supply noise) and random content. This disclosure focuses on random jitter because similar deterministic jitter would apply to all of the oscillators in the array. The random portion of jitter can be described through Gaussian distribution statistics.

Figure 3:
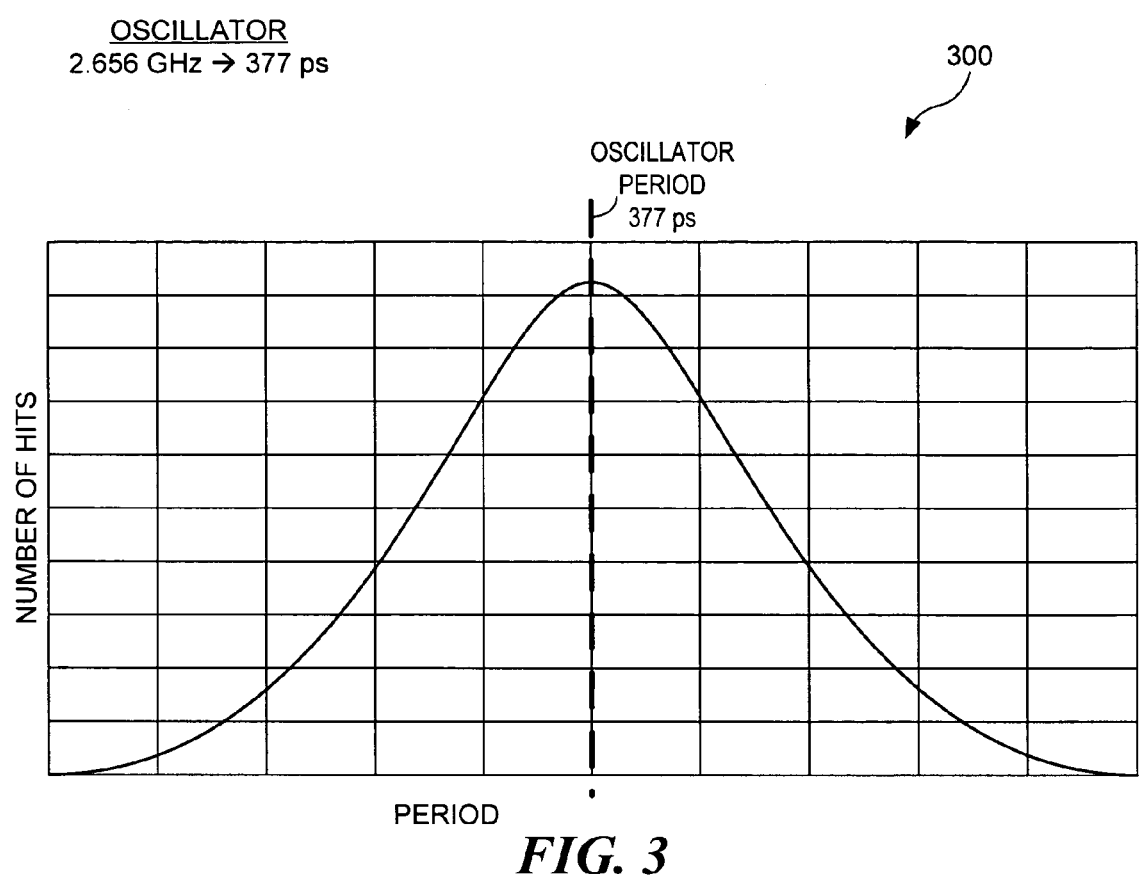
FIG. 3 depicts a sample accumulated histogram that illustrates random jitter within an oscillator.

FIG. 3 depicts a sample accumulated histogram 300 that illustrates random jitter within an oscillator. This histogram 300 shows the properties of Gaussian distribution statistics. This histogram 300 depicts a ring oscillator with a frequency of 2.565 GHz and a period of 377 ps. The y-axis is the number of hits measured for the particular period. In other words, the oscillator is sampled a large number of times and the period measured is recorded as a hit. Accordingly, a small number of hits for a period indicates that the specific period is rare, and a large number of hits indicates that the specific period is common. This histogram illustrates that one sample from a specific oscillator cannot be predicted because the period of the oscillator is constantly changing due to jitter.

Therefore, assuming that the random jitter from an oscillator is Gaussian with mean value of zero, then:

$$J_{rms} = J_i \sqrt{(M)}:$$

wherein:
$J_{rms}$=Root Mean Squared ("RMS") Accumulated Jitter after M Cycles
$J_i$=Intrinsic RMS Random Jitter
M=Number of Cycles As an example, if we sample a 2.656 GHz oscillator with 7.525 ps RMS jitter ($J_{rms}$) for a time of 100 msec (which translates to M=265,000,000 cycles), then the accumulated jitter will be 122.64 ns (which translates to M=325.72 cycles). In a preferred embodiment, each oscillator within the array has a different frequency, and therefore has a different cycle value (M) and accumulated jitter value ($J_{rms}$) even if the intrinsic random jitter ($J_i$) is the same. This indicates that each bit ($Q_1$, $Q_2$, or $Q_N$) in the random number determination logic 110 is a random value that is independent from every other bit value. Therefore, these bit values ($Q_1$, $Q_2$, and $Q_N$) are suitable to create an unpredictable random number seed to be used by the processor 100.

Figure 4:
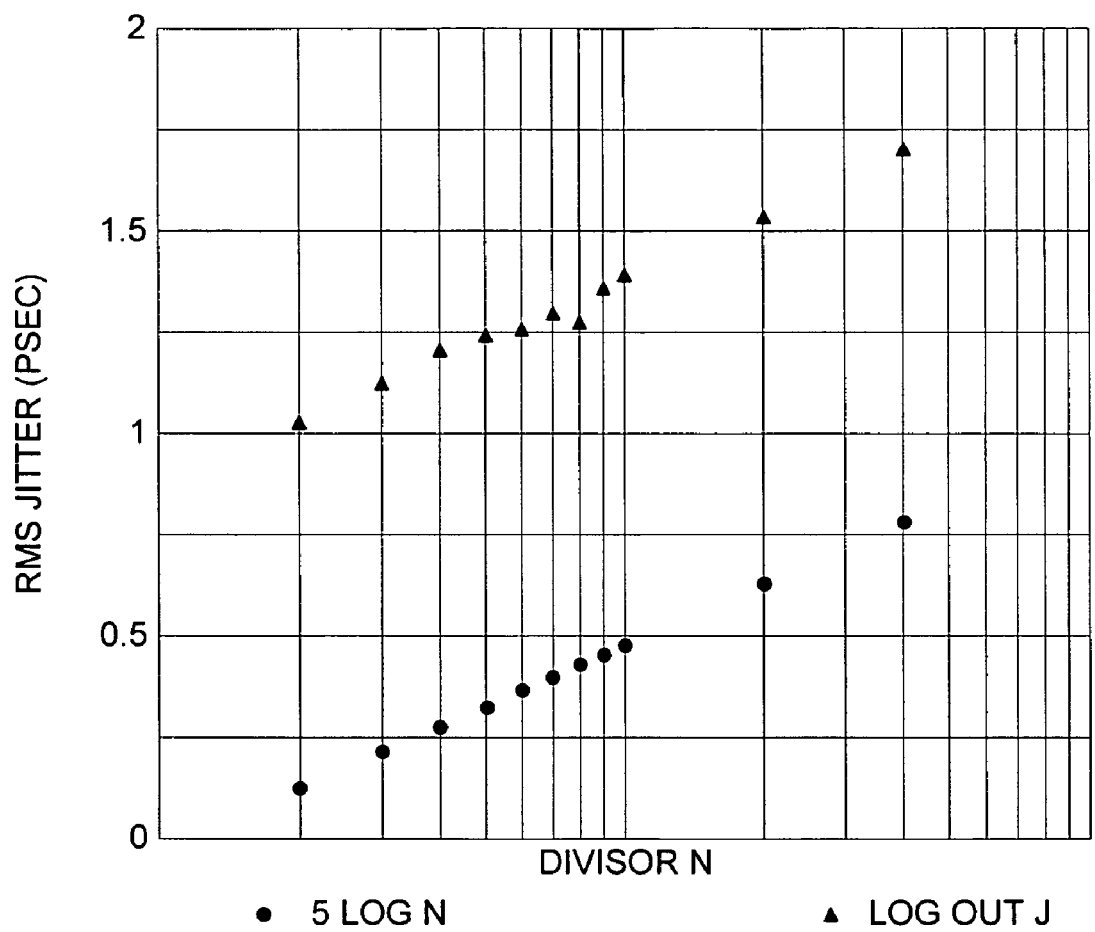
FIG. 4 depicts a log based chart that illustrates simulation results based on free-running oscillator empirical data.

FIG. 4 depicts a log based chart that illustrates simulation results based on free-running oscillator empirical data. In a preferred embodiment, these free-running oscillators make up array of oscillators 106. If an oscillator exhibits Gaussian characteristics, then:

$$\log(J_{rms}) = \log(J_i) + \tfrac{1}{2}\log(n)$$

wherein: n=sampling interval in number of cycles

This equation indicates that log ($J_{rms}$) should show parallelism to ½ log (n) for oscillators that exhibit Gaussian properties. The y-axis measures RMS Jitter ($J_{rms}$) in psec, and the x-axis measures a time interval related to the divisor n. The circles on the graph represent ½ log (n) results for oscillators sampled at different times, and the triangles represent log ($J_{rms}$) results for oscillators sampled at different times. Each oscillator has an inherent value of n that relates to the random jitter of the oscillator that is sampled after a specific amount of cycles. Therefore, circles and triangles that have the same n value relate to the same oscillator sampled at the same time. From the chart, the values of ½ log (n) and the values of log ($J_{rms}$) are clearly parallel. This empirical data proves that free-running oscillators exhibit Gaussian distribution. These oscillators are ideal for the present invention due to random jitter characteristics. As previously described, these free-running oscillators will produce digital bit values that cannot be predicted or determined.

Figure 5:
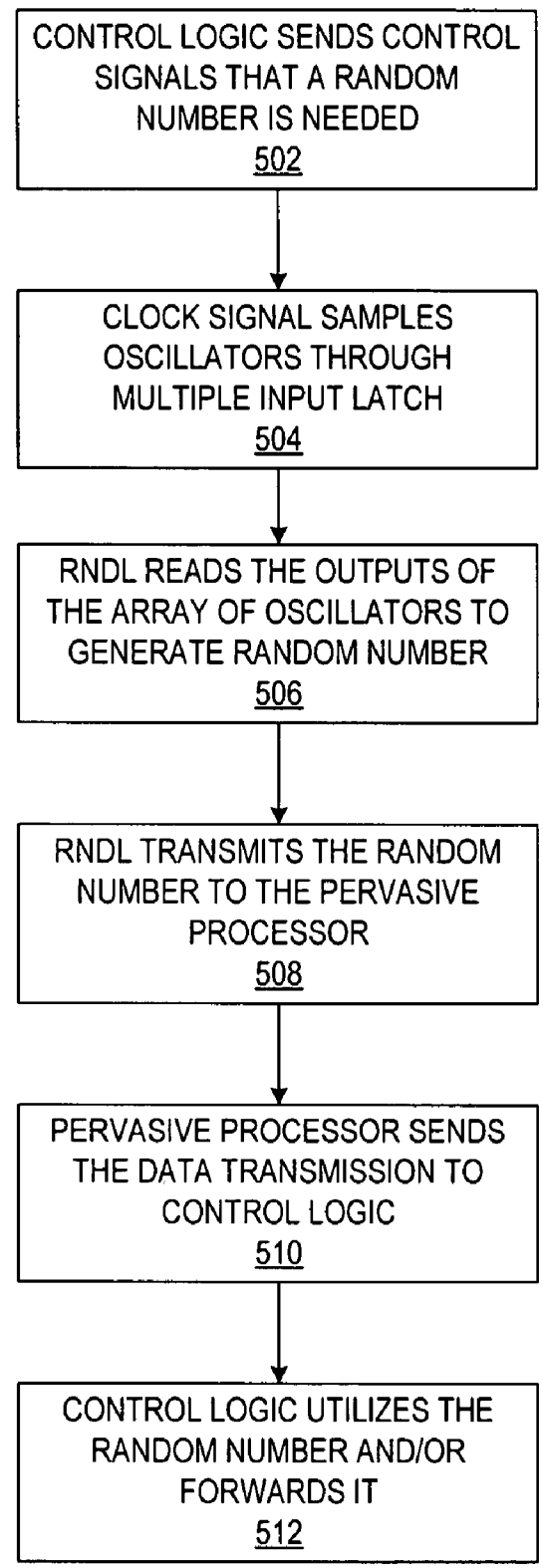
FIG. 5 depicts a flow chart illustrating the random number generation process.

FIG. 5 depicts a flow chart illustrating the random number generation process. First, in step 502, control logic 102 sends out control signals to pervasive processor 108 and the RNDL 110 that request a random number seed. As previously described a random number seed can transform into multiple random number seeds. In step 504, a clock signal samples array of oscillators 106 through the multiple input latch 202. RNDL 110 transforms the outputs from the oscillators into digital bits and then into a random number 506. In step 508, RNDL 110 transmits the random number to pervasive processor 108 as a digital bit representation. In step 510, pervasive processor 108 transmits the random number to control logic 102. In step 512, control logic 102 utilizes the random number within the processor and/or forwards it to external devices. FIG. 5 is only an example of the random number generation process for the present invention, and does not limit the present invention to this process.

Figure 6:
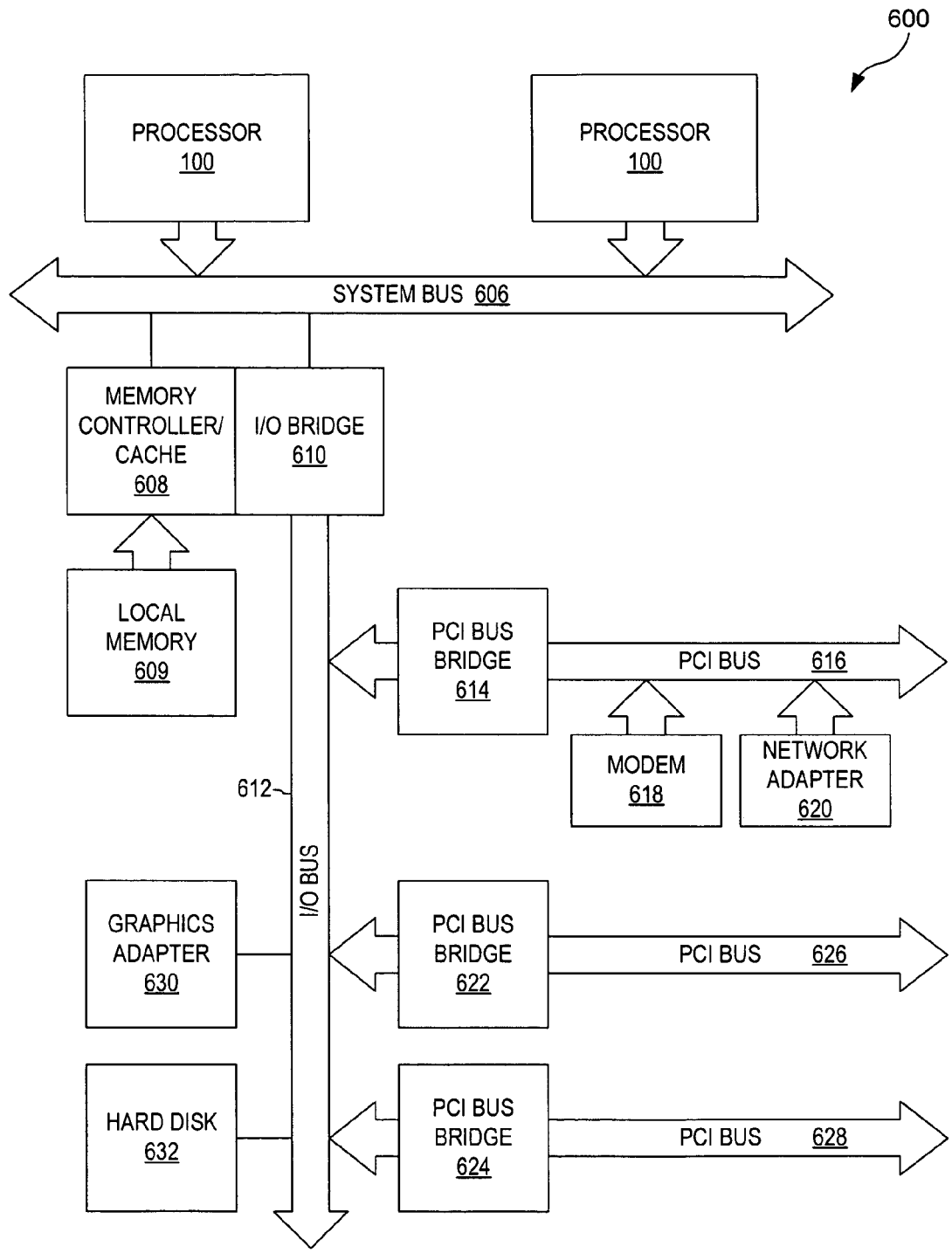
FIG. 6 depicts a block diagram of a data processing system.

FIG. 6 depicts a block diagram of data processing system 600 that may be implemented, for example, as a server, client computing device, handheld device, notebook, or other types of data processing systems, in accordance with an embodiment of the present invention. Data processing system 600 may implement aspects of the present invention, and may be a symmetric multiprocessor ("SMP") system or a non-homogeneous system having a plurality of processors, 100 and 100 connected to the system bus 606. Alternatively, the system may contain a single processor 100.

Memory controller/cache 608 provides an interface to local memory 609 and connects to system bus 606. I/O Bus Bridge 610 connects to system bus 606 and provides an interface to I/O bus 612. Memory controller/cache 608 and I/O Bus Bridge 610 may be integrated as depicted. Peripheral component interconnect ("PCI") bus bridge 614 connected to I/O bus 612 provides an interface to PCI local bus 616. A number of modems may be connected to PCI local bus 616. Typical PCI bus implementations will support four PCI expansion slots or add-in connectors. Modem 618 and network adapter 620 provide communications links to other computing devices connected to PCI local bus 616 through add-in connectors (not shown). Additional PCI bus bridges 622 and 624 provide interfaces for additional PCI local buses 626 and 628, from which additional modems or network adapters (not shown) may be supported. In this manner, data processing system 600 allows connections to multiple network computers. A memory-mapped graphics adapter 630 and hard disk 632 may also be connected to I/O bus 612 as depicted, either directly or indirectly.

Accordingly, the hardware depicted in FIG. 6 may vary. For example, other peripheral devices, such as optical disk drives and the like, also may be used in addition to or in place of the hardware depicted. The depicted example does not imply architectural limitations with respect to the present invention. For example, data processing system 500 may be, for example, an IBM Deep Blue system, CMT-5 system, products of International Business Machines Corporation in Armonk, N.Y., or other multi-core processor systems, running the Advanced Interactive Executive ("AIX") operating system, LINUX operating system, or other operating systems.

It is understood that the present invention can take many forms and embodiments. Accordingly, several variations of the present design may be made without departing from the scope of the invention. The capabilities outlined herein allow for the possibility of a variety of networking models. This disclosure should not be read as preferring any particular networking model, but is instead directed to the underlying concepts on which these networking models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A random number generator within a processor, comprising:
   an array of oscillators, wherein each oscillator operates at a different frequency and wherein the operating frequencies of each oscillator are not harmonically related, such that no integer multiple exists between the frequencies of any two oscillators;
   an array of latches, wherein each latch receives an input from a separate oscillator, receives a sample signal, and produces an output signal of the oscillator in response to the sample signal; and
   random number determination logic ("RNDL"), wherein the RNDL is at least configured to receive the output signals of the array of latches and generate a random number seed.

2. The random number generator of claim 1, wherein the random number generator is used in a computer system or a data processing system.

3. The random number generator of claim 1, wherein the array of oscillators comprise a plurality of multistage free-running ring oscillators.

4. The random number generator of claim 1, wherein the array of latches further comprise one multiple input latch or one multiple input flip-flop coupled to the array of oscillators, that is at least configured to produce an output signal for each oscillator within the array.

5. The random number generator of claim 1, wherein in the array of latches further comprise an array of flip-flops coupled to the array of oscillators.

6. The random number generator of claim 1, wherein the sample signal is a clock signal that samples the output signals from the array of oscillators.

7. The random number generator of claim 1, wherein the RNDL is at least configured to:
   read a digital output (0's or 1's) from each latch of the array of latches; and
   produce a random number seed containing those digital outputs.

8. The RNDL of claim 7, wherein the RNDL is at least configured to transmit the random number seed to other areas of the processor.

9. A method, in a processor, for producing a random number seed, comprising:
   configuring an array of oscillators so that each oscillator operates at a different frequency and wherein the operating frequencies of each oscillator are not harmonically related, such that no integer multiple exists between the frequencies of any two oscillators;
   coupling an array of latches to the array of oscillators so that each latch is coupled to a separate oscillator;
   generating a sample signal;
   transmitting the sample signal to the array of latches;
   in response to the sample signal, generating output signals from the array of oscillators;
   producing a random number seed from the output signals of the array of oscillators.

10. The method of claim 9, wherein the method is used in a computer system or a data processing system.

11. The method of claim 9, wherein the array of oscillators comprise a plurality of multistage free-running oscillators.

12. The method of claim 9, wherein the array of latches further comprise one multiple input latch or one multiple input flip-flop coupled to the array of oscillators, that is at least configured to produce an output signal for each oscillator within the array.

13. The method of claim 9, wherein the array of latches further comprise an array of flip-flops coupled to the array of oscillators.

14. The method of claim 9, wherein the step of generating a sample signal further comprises generating a clock signal designed to sample the output signals from the array of oscillators.

15. The method of claim 9, wherein the step of generating output signals in response to the sample signal further comprises configuring the array of latches so that they produce digital outputs (0's and 1's) of the signals from the array of oscillators in response to the sample signal.

16. The method of claim 9, wherein the step of generating a random number seed further comprises:
   reading a digital output (0's or 1's) from each latch of the array of latches; and
   producing a random number seed containing those digital outputs.

17. The method of claim 16, wherein producing the random number seed further comprises transmitting the random number seed to other areas of the processor.

18. A computer program product for producing a random number seed, with the computer program product having computer code stored in a computer storage medium for execution by a computer, wherein the computer program comprises:
   said computer code for configuring an array of oscillators so that each oscillator operates at a different frequency and wherein the operating frequencies of each oscillator are not harmonically related, such that no integer multiple exists between the frequencies of any two oscillators;
   said computer code for coupling an array of latches to the array of oscillators so that each latch is coupled to a separate oscillator;
   said computer code for generating a sample signal;
   said computer code for transmitting the sample signal to the array of latches;
   in response to the sample signal, said computer code for generating output signals from the array of oscillators; and
   said computer code for producing a random number seed from the output signals of the array of oscillators.

* * * * *